(12) United States Patent
Nishimura et al.

(10) Patent No.: US 8,358,494 B2
(45) Date of Patent: Jan. 22, 2013

(54) DIELECTRIC CERAMIC AND MANUFACTURING METHOD THEREFOR AND LAMINATED CERAMIC CAPACITOR

(75) Inventors: Hitoshi Nishimura, Yasu (JP); Noriyuki Inoue, Yasu (JP); Takafumi Okamoto, Kusatsu (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 286 days.

(21) Appl. No.: 12/791,910

(22) Filed: Jun. 2, 2010

(65) Prior Publication Data

US 2010/0328844 A1    Dec. 30, 2010

(30) Foreign Application Priority Data

Jun. 30, 2009   (JP) .................. 2009-154634

(51) Int. Cl.
*H01G 4/06*     (2006.01)
*C04B 35/00*   (2006.01)
(52) U.S. Cl. ..................... 361/321.2; 501/136; 29/25.42
(58) Field of Classification Search .... 361/321.1–321.5; 29/25.42; 501/136–138
See application file for complete search history.

(56) References Cited

U.S. PATENT DOCUMENTS

| 7,242,571 | B2 | 7/2007 | Okamatsu et al. |
| 2005/0122639 | A1 | 6/2005 | Okamatsu et al. |
| 2005/0219795 | A1 | 10/2005 | Murosawa et al. |

FOREIGN PATENT DOCUMENTS

| CN | 1677588 A | 10/2005 |
| JP | 9025162 A | 1/1997 |
| JP | 11302072 A | 11/1999 |
| JP | 2000-335966 A | 12/2000 |
| JP | 2002050536 A | 2/2002 |
| JP | 2002231560 A | 8/2002 |
| JP | 2005-008471 A | 1/2005 |
| JP | 2005217000 A | 8/2005 |
| JP | 2005294290 A | 10/2005 |
| JP | 2006199563 A | 8/2006 |
| WO | WO-2004/067473 | 8/2004 |
| WO | WO-2006025205 A1 | 3/2006 |

OTHER PUBLICATIONS

Veer et al., Effect of sintering aid on physical and magnetoelectric properties of La0.7Sr0.3MnO3-BaTiO3 composites, Apr. 2008, Indian Journal of Engineering & Materials Sciences, vol. 15, pp. 121-125.*

* cited by examiner

*Primary Examiner* — Eric Thomas
(74) *Attorney, Agent, or Firm* — Dickstein Shapiro LLP

(57) ABSTRACT

A laminated ceramic capacitor is provided which is excellent in reliability even when its dielectric ceramic layers thinned. For a dielectric ceramic in a laminated ceramic capacitor, a ceramic is used which includes a main component containing a barium titanate based composite oxide represented by the general formula: $(Ba_{1-h-m-x}Ca_hSr_mRe_x)_k(Ti_{1-n-y}Zr_nM_y)O_3$, where Re is La or the like, M is Mg or the like, and the respective relationships of $0.05 \leq x \leq 0.50$, $0.02 \leq y \leq 0.3$, $0.85 \leq k \leq 1.05$, $0 \leq h \leq 0.25$, $0 \leq m \leq 0.50$, and $0 \leq n \leq 0.40$ are satisfied; and an accessory component as a sintering aid, wherein the average grain diameter of crystal grains in a sintered body is 0.6 µm or less.

20 Claims, 1 Drawing Sheet

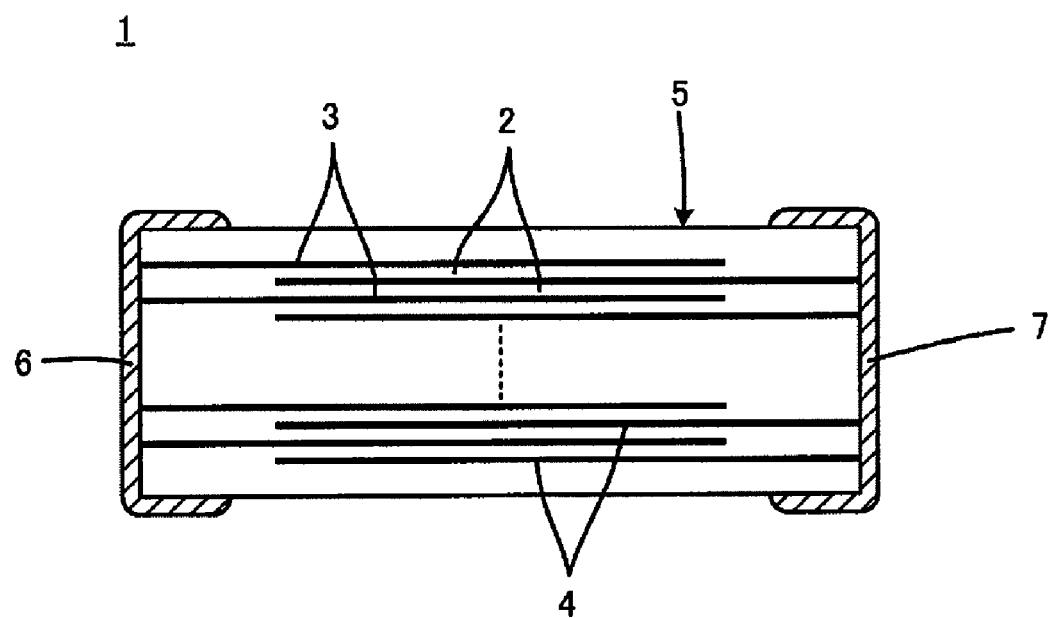

DIELECTRIC CERAMIC AND MANUFACTURING METHOD THEREFOR AND LAMINATED CERAMIC CAPACITOR

BACKGROUND OF THE INVENTION

1. Field of the Invention

The invention relates to a dielectric ceramic, a method for manufacturing the dielectric ceramic, and a laminated ceramic capacitor composed with use of the dielectric ceramic, and in particular, relates to an improvement for enhancing the reliability of the laminated ceramic capacitor.

2. Description of the Related Art

While a variety of rated voltages are used for laminated ceramic capacitors, high insulation properties (insulation resistance) and reliability (lifetime characteristics in a high temperature load test) are required for the ceramic material constituting dielectric ceramic layers of, in particular, laminated ceramic capacitors to which middle to high voltages (several tens V to several hundreds V) are applied.

In addition, in the past several years, the need for reduction in size of laminated ceramic capacitors has increased. Thus, in order to ensure at least a predetermined capacitance in the case of small sizes, thinner dielectric ceramic layers have been demanded. However, the thinner the dielectric ceramic layers are, the higher is the intensity of an electric field applied to each of the dielectric ceramic layers. The higher intensity effects achieving the reliability, in particular, higher lifetime characteristic in a load test, which has been required for the dielectric ceramic.

Dielectric ceramics which can satisfy such demands are disclosed, for example, in International Publication No. WO2004/067473.

International Publication No. WO2004/067473 discloses a dielectric ceramic containing: a main component composed of barium titanate based composite oxide with some Ba substituted with Gd and some Ti substituted with Mg, which is represented by the general formula: $(Ba_{1-h-i-m}Ca_hSr_iGd_m)_k(Ti_{1-y-j-n}Zr_yHf_jMg_n)O_3$ and satisfies respective relationships of $0.995 \leq k \leq 1.015$, $0 \leq h \leq 0.03$, $0 \leq i \leq 0.03$, $0.015 \leq m \leq 0.035$, $0 \leq y < 0.05$, $0 \leq j < 0.05$, $0 \leq y+j < 0.05$, and $0.015 \leq n \leq 0.035$; and addition components of Ma (Ma is at least one of Ba, Sr, and Ca) at less than 1.5 moles, however, excluding 0 moles, with respect to 100 moles of the main component, Mb (Mb is at least one of Mn and Ni) at less than 1.0 mole, however, excluding 0 moles, with respect to 100 moles of the main component, and Mc (Mc is Si, or both Si and Ti) at 0.5 moles or more and 2.0 moles or less with respect to 100 moles of the main component.

The main component of the dielectric ceramic described above may not contain Ca, Sr, Zr, or Hf. Thus, one characteristic is that Gd and Mg are present. As described above, Gd is contained at 3.5 mol % or less, whereas Mg is contained at 3.5 mol % or less.

The rare earth element Gd is brought into the A sites of a perovskite structure represented by $ABO_3$ as a solid solution, whereas Mg is brought into B sites of the perovskite structure, thereby achieving high reliability. However, there is a problem in that the substitution contents of Gd and Mg are low and both are 3.5 mol % or less, thereby resulting in the inability to achieve sufficient reliability.

On the other hand, International Publication No. WO2004/067473 discloses a grain diameter of preferably 2.5 μm or less, more preferably 1.5 μm or less, and even more preferably 1 μm or less, for the grain diameters of crystal grains in the dielectric ceramic as a sintered body. In all cases, the crystal grains in the sintered body for the dielectric ceramic described in International Publication No. WO2004/067473, have a large grain diameter of 0.9 μm or more. Accordingly, as thinning is progressed, the number of crystal grains present in each dielectric ceramic layer will be reduced, easily leading to a problem with reliability.

In addition, while a method of increasing the substitution amounts of the rare earth element such as Gd and the element such as Mg is conceivable in order to improve reliability, the crystal grains will likely be further increased in this case.

SUMMARY OF THE INVENTION

Therefore, an object of the invention is to provide a dielectric ceramic and a method for manufacturing the dielectric ceramic, which can solve the problems described above.

Another object of the invention is to provide a laminated ceramic capacitor composed with use of the dielectric ceramic mentioned above.

In order to solve the technical problems described above, the invention is directed to a dielectric ceramic including a main component containing a barium titanate based composite oxide represented by the general formula: $(Ba_{1-h-m-x}Ca_hSr_mRe_x)_k(Ti_{1-n-y}Zr_nM_y)O_3$, where Re is at least one of La, Ce, Pr, Nd, Sm, Eu, Gd, Tb, Dy, Ho, Er, Tm, Yb, Lu, and Y, M is at least one of Mg, Ni, Mn, Al, Cr, and Zn, and respective relationships of $0.05 \leq x \leq 0.50$, $0.02 \leq y \leq 0.3$, $0.85 \leq k \leq 1.05$, $0 \leq h \leq 0.25$, $0 \leq m \leq 0.50$, and $0 \leq n \leq 0.40$ are satisfied; and an accessory component as a sintering aid, wherein the average grain diameter of crystal grains in a sintered body is 0.6 μm or less.

It is to be noted that the grain diameter is obtained by observing a cross section of the dielectric ceramic with use of a scanning electron microscope, and the average grain diameter is obtained by averaging the grain diameters of, for example, 30 grains.

The invention is also directed to a method for manufacturing the dielectric ceramic as described above.

A method for manufacturing a dielectric ceramic according to the invention includes first step of obtaining a reactant containing a barium titanate based composite oxide represented by the general formula: $(Ba_{1-h-m-x}Ca_hSr_mRe_x)_k(Ti_{1-n-y}Zr_nM_y)O_3$, where Re is at least one of La, Ce, Pr, Nd, Sm, Eu, Gd, Tb, Dy, Ho, Er, Tm, Yb, Lu, and Y, M is at least one of Mg, Ni, Mn, Al, Cr, and Zn, and respective relationships of $0.05 \leq x \leq 0.50$, $0.02 \leq y \leq 0.3$, $0.85 \leq k \leq 1.05$, $0 \leq h \leq 0.25$, $0 \leq m \leq 0.50$, and $0 \leq n \leq 0.40$ are satisfied; second step of preparing an accessory component as a sintering aid; third step of mixing the accessory component prepared in second step into the reactant obtained in first step; and fourth step of calcining the mixture obtained in third step.

In the first step, multiple raw material powders including a $BaCO_3$ powder are calcined in order to obtain the reactant in such a way that unreacted $BaCO_3$ remains so that the intensity ratio between the (111) diffraction peak of $BaCO_3$ and the (110) diffraction peak of $BaTiO_3$ by X-ray diffraction analysis of the calcined powder is 15/1000 or more and 200/1000 or less, and is carried forward so that the third step mixture contains the unreacted reactant.

The invention is also directed to a laminated ceramic capacitor including: a capacitor main body composed of a plurality of laminated dielectric ceramic layers and a plurality of internal electrodes formed along specific interfaces between the dielectric ceramic layers; and a plurality of external electrodes formed in different positions from each other on an external surface of the capacitor main body and electrically connected to specific ones of the internal electrodes.

In the laminated ceramic capacitor according to the invention, the dielectric ceramic layers contain the dielectric ceramic according to the invention.

Although the dielectric ceramic according to the invention contains relatively large amounts of Re and M in the composition of the main component, grain growth is suppressed, and the crystal grains have a small average grain diameter of 0.6 µm or less. Thus, even when the dielectric ceramic layers are thin and have a thickness of, for example, less than 3 µm in the laminated ceramic capacitor, excellent reliability, and more particularly, excellent lifetime characteristic, can be achieved.

More specifically, first, since the Re and M are contained in relative large amounts, which are effective for enhancing the reliability, excellent reliability can be achieved. In addition, although the Re and M are contained in relative large amounts, which act to promote grain growth while being effective for enhancing the reliability, grain growth is suppressed to realize an average grain diameter of 0.6 µm or less, and thus, also in this regard, the reliability can be improved.

In accordance with the method for manufacturing a dielectric ceramic according to the invention, the unreacted $BaCO_3$ moderately remains so that the intensity ratio between the (111) diffraction peak of $BaCO_3$ and the (110) diffraction peak of $BaTiO_3$ by X-ray diffraction analysis of the calcined powder is 15/1000 or more and 200/1000 or less, in the calcination procedure of the first step for obtaining the reactant, thereby suppressing grain growth. Therefore, the average grain diameter of crystal grains can be 0.6 µm or less in the obtained dielectric ceramic as a sintered body.

BRIEF DESCRIPTION OF THE DRAWINGS

FIG. 1 is a cross-sectional view schematically illustrating a laminated ceramic capacitor 1 composed with use of a dielectric ceramic according to the invention.

DETAILED DESCRIPTION OF THE INVENTION

First, a laminated ceramic capacitor 1 with a dielectric ceramic according to the invention applied will be described with reference to FIG. 1.

The laminated ceramic capacitor 1 includes a capacitor main body 5 composed of a plurality of laminated dielectric ceramic layers 2 and a plurality of internal electrodes 3 and 4 formed along the specific interfaces between the dielectric ceramic layers 2. The internal electrodes 3 and 4 mainly contain, for example, Ni.

First and second external electrodes 6 and 7 are formed in different positions on the external surface of the capacitor main body 5. The external electrodes 6 and 7 mainly contain, for example, Ag or Cu. The laminated ceramic capacitor 1 shown in FIG. 1 has the first and second external electrodes 6 and 7 formed on the respective end surfaces of the capacitor main body 5 opposed to each other. As for the internal electrodes 3 and 4, the plurality of first internal electrodes 3 is electrically connected to the first external electrode 6, whereas the plurality of second internal electrodes 4 is electrically connected to the second external electrode 7. These first and second internal electrodes 3 and 4 are arranged alternately with respect to the stacking direction.

It is to be noted that the laminated ceramic capacitor 1 may be a two-terminal laminated ceramic capacitor provided with the two external electrodes 6 and 7, or may be a multi-terminal laminated ceramic capacitor provided with a large number of external electrodes.

The dielectric ceramic layers 2 are composed of the following dielectric ceramic as a feature of the invention.

That is, the dielectric ceramic layers 2 includes a main component containing a barium titanate based composite oxide represented by the general formula: $(Ba_{1-h-m-x}Ca_hSr_mRe_x)_k(Ti_{1-n-y}Zr_nM_y)O_3$, where Re is at least one of La, Ce, Pr, Nd, Sm, Eu, Gd, Tb, Dy, Ho, Er, Tm, Yb, Lu, and Y, M is at least one of Mg, Ni, Mn, Al, Cr, and Zn, and respective relationships of $0.05 \leq x \leq 0.50$, $0.02 \leq y \leq 0.3$, $0.85 \leq k \leq 1.05$, $0 \leq h \leq 0.25$, $0 \leq m \leq 0.50$, and $0 \leq n \leq 0.40$ are satisfied; and an accessory component as a sintering aid, wherein the average grain diameter of crystal grains in the sintered body is 0.6 µm or less.

Although the dielectric ceramic described above contains relatively large amounts of Re and M in the composition of the main component, grain growth is suppressed, and the crystal grains have a small average grain diameter of 0.6 µm or less. Thus, even when the dielectric ceramic layers 2 are thin and have a thickness of, for example, less than 3 µm, excellent reliability, and more particularly, excellent lifetime characteristic can be achieved.

Next, a preferred embodiment of a method for manufacturing a dielectric ceramic according to the invention will be described while describing a method for manufacturing the laminated ceramic capacitor 1 shown in FIG. 1.

First, a raw material powder for the dielectric ceramic constituting the dielectric ceramic layers 2 is prepared. This raw material is preferably manufactured as follows.

First, carried out is first step of obtaining a reactant containing a barium titanate based composite oxide represented by the general formula: $(Ba_{1-h-m-x}Ca_hSr_mRe_x)_k(Ti_{1-n-y}Zr_nM_y)O_3$, where Re is at least one of La, Ce, Pr, Nd, Sm, Eu, Gd, Tb, Dy, Ho, Er, Tm, Yb, Lu, and Y, M is at least one of Mg, Ni, Mn, Al, Cr, and Zn, in which the respective relationships of $0.05 \leq x \leq 0.50$, $0.02 \leq y \leq 0.3$, $0.85 \leq k \leq 1.05$, $0 \leq h \leq 0.25$, $0 \leq m \leq 0.50$, and $0 \leq n \leq 0.40$ are satisfied.

In this first step, calcining multiple raw material powders including a $BaCO_3$ powder is carried out in order to obtain the composite oxide reactant. More specifically, in addition to the $BaCO_3$ powder, powders of compounds each containing the elements included in the general formula mentioned above are mixed to provide a predetermined composition ratio, calcined in air, and then ground.

The calcination conditions, such as the calcination temperature, are controlled in such a way that the intensity ratio between the (111) diffraction peak of $BaCO_3$ and the (110) diffraction peak of $BaTiO_3$ by X-ray diffraction analysis of the calcined powder is 15/1000 or more and 200/1000 or less so that a predetermined amount of unreacted $BaCO_3$ remains. It is to be noted that it is conceivable that in addition to the calcination conditions, the specific surface area of a starting raw material, the grinding conditions, and the like will also affect the residual amount of the unreacted carbonate. This unreacted $BaCO_3$ acts to advantageously suppress grain growth in the calcination step described below.

The second step is carried out for preparing an accessory component as a sintering aid, such as MnO or $SiO_2$.

Next, a third step is carried out to combine the accessory component prepared in second step into the reactant obtained in first step. The mixture obtained in third step is a raw material powder for the dielectric ceramic, which also includes the unreacted $BaCO_3$.

Next, a slurry is manufactured by adding an organic binder and a solvent to the mixture obtained in third step, that is, the raw material powder for the dielectric ceramic, and mixing them, and this slurry is used to form ceramic green sheets serving as the dielectric ceramic layers 2.

Then, a conductive paste containing, for example, Ni, as a conductive component is printed on specific ceramic green sheets to form a conductive paste film serving as an internal electrode 3 or 4.

Then, a plurality of ceramic green sheets with the conductive paste films formed as described above are stacked, and ceramic green sheets with no conductive paste film formed are stacked so as to sandwich the ceramic green sheets with the conductive paste films, and subjected to pressure bonding, followed by cutting, if necessary, thereby obtaining a raw laminated body serving as a capacitor main body 5. In this raw laminated body, the conductive paste films have end edges exposed at either end surface.

Then, a fourth step is carried out for calcination of the mixture obtained in third step. More specifically, the step is carried out for calcination of the raw laminated body in a reducing atmosphere. This step provides a sintered capacitor main body 5 as shown in FIG. 1, and in the capacitor main body 5, the ceramic green sheets constitute the dielectric ceramic layers 2 composed of the dielectric ceramic, and the conductive paste films constitute the internal electrode 3 or 4.

The dielectric ceramic as the sintered body constituting the dielectric ceramic layers 2 has an average crystal grain diameter of 0.6 μm or less.

Then, external electrodes 6 and 7 are formed respectively by baking of a conductive paste containing, for example, Ag, on respective end surfaces of the capacitor main body 5, so as to be electrically connected to respective exposed end edges of the internal electrodes 3 and 4.

Then, if necessary, a plating film such as nickel or copper is formed on the external electrodes 6 and 7, and a plating film such as solder or tin is formed thereon.

As described above, the laminated ceramic capacitor 1 is completed.

Next, the invention will be described more specifically with reference to experimental examples.

EXPERIMENTAL EXAMPLE 1

As staring raw materials for the main component for a dielectric ceramic, respective powders of $BaCO_3$, $CaCO_3$, $SrCO_3$, $TiO_2$, $ZrO_2$, $Gd_2O_3$, and MgO were prepared. It is to be noted that a powder with a specific surface area of 11 m$^2$/g and a powder with a specific surface area of 13 m$^2$/g were selected respectively as the $BaCO_3$ powder and the $TiO_2$ powder.

Next, each of the starting raw materials was weighed so as to achieve a composition ratio of $(Ba_{0.89}Ca_{0.01}Sr_{0.01}Gd_{0.10})(Ti_{0.93}Zr_{0.01}Mg_{0.06})O_3$.

Next, for samples 1 to 4 shown in Table 1, 100 g of the weighed raw material powders were each mixed and ground with 130 g of water in a wet manner for 50 hours in a ball mill with PSZ balls of 0.8 mm in diameter, and then dried, calcined in air for 2 hours at each temperature in the range of 950 to 1150° C. shown in the column "Calcination Temperature" of Table 1, to obtain a barium titanate based raw material powder.

Samples 5 to 8 shown in Table 1 are comparative examples.

For sample 5, the same process as in the case of samples 1 to 4 was carried out except that a temperature of 1150° C. was applied upon calcination, as shown in the column "Calcination Temperature" of Table 1.

For sample 6, the same process as in the case of samples 1 to 4 was carried out except that a temperature of 400° C. was applied upon calcination, as shown in the column "Calcination Temperature" of Table 1.

For sample 7, 100 mol parts of $BaTiO_3$ powder with 1 mol part of $CaCO_3$ powder, 1 mol part of $SrCO_3$ powder, 1 mol part of $ZrO_2$ powder, 10 mol parts of $Gd_2O_3$ powder, and 6 mol parts of MgO powder added to was used as a raw material powder without calcination.

Sample 8 was obtained by adding MgO powder after initial mixing and calcination, rather than during the mixing or the calcination. More specifically, the calcination temperature of 1100° C. was applied to a composition of $(Ba_{0.89}Ca_{0.01}Sr_{0.01}Gd_{0.10})(Ti_{0.99}Zr_{0.01})O_3$, as shown in the column "Calcination Temperature" of Table 1 to carry out the process up to the calcination, and then the MgO powder was added to achieve a content of 6 mol parts.

Next, the intensity ratio between the (111) diffraction peak of $BaCO_3$ and the (110) diffraction peak of $BaTiO_3$ was evaluated by X-ray diffraction analysis (XRD) for the calcined powders. The results are shown in the column of the "Peak Ratio" in Table 1.

Next, to 100 mol parts of the barium titanate based raw material powder according to each sample, 1 mol part of $BaCO_3$ for correction of the Ba/Ti ratio was further added, and 1 mol part of MnO powder and 2 mol parts of $SiO_2$ powder were each added as raw materials for accessory components serving as sintering aids, followed by wet mixing and grinding in a ball mill, and then drying.

Next, the dried mixed powder was mixed with a polyvinyl butyral based binder and mixed in a wet manner in a ball mill to prepare a slurry. This slurry was subjected to sheet forming by a doctor blade method to rectangular ceramic green sheets. It is to be noted here that the thicknesses of the ceramic green sheets to be formed were controlled so as to achieve respective thicknesses of 1.5 μm, 3 μm and 4.5 μm for calcined dielectric ceramic layers obtained from the ceramic green sheets, as shown in Table 1.

Next, a conductive paste mainly containing Ni was printed on the ceramic green sheets to form conductive paste films serving as internal electrodes.

Next, 102 sheets of the ceramic green sheets with the conductive paste films formed were stacked so that the drawn ends of the conductive paste films are alternately arranged, thereby obtaining a raw laminated body serving as a capacitor main body.

Next, the raw laminated body was heated to a temperature of 350° C. in a $N_2$ atmosphere to burn out the binder, and then calcined at a temperature within the range of 1000 to 1200° C. in a reducing atmosphere composed of a $H_2$—$N_2$—$H_2O$ gas with an oxygen partial pressure of $10^{-9}$ to $10^{-12}$ MPa to obtain a sintered capacitor main body.

Next, an Ag paste containing a $B_2O_3$—$Li_2O$—$SiO_2$—$BaO$ based glass frit was applied to both end surfaces of the sintered capacitor main body, and baked at a temperature of 600° C. in a $N_2$ atmosphere to form external electrodes electrically connected to the internal electrodes, thereby obtaining a laminated ceramic capacitor as a sample.

The laminated ceramic capacitor thus obtained had outside dimensions of 3.2 mm in length and 1.6 mm in width.

Next, the laminated ceramic capacitors according to each sample were evaluated for the "grain diameter" and the "failure rate".

The "Grain Diameter" shown in Table 1 was obtained by observing a cross section in the stacking direction of the capacitor main body according to each sample with use of a scanning electron microscope, selecting 30 or more crystal grains, measuring the grain diameters of the respective crystal grains, and averaging the grain diameters.

The "Failure Rate" shown in Table 1 indicates reliability excellence, and shows the number of failed samples after a lapse of 50 hours with respect to 100 samples, through the evaluation of the insulation degradation lifetime by subjecting the laminated ceramic capacitor according to each sample to a high temperature load test. In the high temperature load test, a voltage was applied to the laminated ceramic capacitor according to each sample at a temperature of 190° C. so as to provide an electric field intensity of 30 kV/mm, and when the insulation resistance after the test was decreased by three or more orders of magnitude as compared with the insulation resistance before the test, the sample was determined as a failed sample.

TABLE 1

| Sample Number | Calcination Temperature (° C.) | Peak Ratio $BaCO_3/BaTiO_3$ | Grain Diameter (μm) | 1.5 μm Failure Rate | 3 μm Failure Rate | 4.5 μm Failure Rate |
|---|---|---|---|---|---|---|
| 1 | 950 | 200/1000 | 0.47 | 2/100 | 2/100 | 0/100 |
| 2 | 1000 | 162/1000 | 0.28 | 0/100 | 0/100 | 0/100 |
| 3 | 1050 | 95/1000 | 0.35 | 3/100 | 2/100 | 0/100 |
| 4 | 1100 | 18/1000 | 0.58 | 9/100 | 3/100 | 0/100 |
| 5* | 1150 | 10/1000 | 0.98 | 100/100 | 11/100 | 0/100 |
| 6* | 400 | — | 1.7 | 100/100 | 77/100 | 31/100 |
| 7* | — | — | 0.45 | 100/100 | 100/100 | 56/100 |
| 8* | 1100 | 0/1000 | 0.20 | 100/100 | 100/100 | 100/100 |

Table 1 shows that when the peak ratio is 15/1000 or more and 200/1000 or less, as in the case of samples 1 to 4, a dielectric ceramic can be obtained which meets the requirement of an average grain diameter of 0.6 μm or less.

In addition, for samples 1 to 4 which meet the size requirement, even when the dielectric ceramic layers were thinned to have a thickness of 1.5 μm, excellent reliability was achieved, as indicated by a failure rate within 10%. The effect of the improvement in reliability can be said to be more significant with an increase in the thinness of the layers, because for comparative example sample 5, the failure rate is sharply increased in the sample with dielectric ceramic layers of 1.5 μm in thickness, as compared with the respective samples with dielectric ceramic layers of 3 μm and 4.5 μm in thickness.

For the comparative example sample 6, it was not possible to determine the peak ratio because $BaTiO_3$ was not synthesized in the calcination step. In addition, the grain diameter was large in the sintered body, with an increased failure rate.

In addition, the grain diameter of sample 7 was small because Gd as the Re element and Mg as the M element were not sufficiently present in the grains. The failure rate was extremely high.

For sample 8, the grain diameter was small because Mg as the M element was not sufficiently present in the grains. However, the failure rate was all 100/100.

EXPERIMENTAL EXAMPLE 2

As staring raw materials supposed to be main components for a dielectric ceramic, respective powders of $BaCO_3$, $CaCO_3$, $SrCO_3$, $TiO_2$ and $ZrO_2$, respective powders of $La_2O_3$, $CeO_2$, $Pr_6O_{11}$, $Nd_2O_3$, $Sm_2O_3$, $Eu_2O_3$, $Gd_2O_3$, $Tb_4O_7$, $Dy_2O_3$, $Ho_2O_3$, $Er_2O_3$, $Tm_2O_3$, $Yb_2O_3$, $Lu_2O_3$, and $Y_2O_3$ as oxides of Re, and respective powders of MgO, NiO, MnO, $Al_2O_3$, $Cr_2O_3$, and ZnO as oxides of M were prepared. It is to be noted that the powders with the same specific surface areas as selected in Experimental Example 1 were selected as the $BaCO_3$ powder and the $TiO_2$ powder.

Next, the starting raw materials were weighed so as to achieve composition ratios shown in Table 2 in terms of $(Ba_{1-h-m-x}Ca_hSr_mRe_x)_k (Ti_{1-n-y}Zr_nM_y) O_3$. Next, the weighed raw material powders were mixed and ground in a wet manner in the same way as in Experimental Example 1, and then dried, calcined in air for 2 hours at each temperature in the range of 950 to 1150° C. shown in the column "Calcination Temperature" of Table 2 to obtain a barium titanate based raw material powder.

Next, the intensity ratio between the (111) diffraction peak of $BaCO_3$ and the (110) diffraction peak of $BaTiO_3$ of the calcined powders was evaluated by X-ray diffraction analysis (XRD) in the same way as in Experimental Example 1. The results are shown in the column of the "Peak Ratio" in Table 2.

Next, a MnO powder and a $SiO_2$ powder as accessory components serving as sintering aids were added in the mol parts per 100 mol parts of the barium titanate based raw material powder according to each sample shown in the column "Subsequent Addition" of Table 2, and laminated ceramic capacitors according to each sample were obtained in the same way as in Experimental Example 1. It is to be noted that the calcined dielectric ceramic layers were made to have a thickness of 1.5 μm for all of the samples in Experimental Example 2.

Next, the "Grain Diameter" and "Failure Rate" were evaluated for the laminated ceramic capacitors according to each sample, as shown in Table 2, in the same manner as in the case of Experimental Example 1.

TABLE 2

| Sample Number | K | h | m | n | Re | x | M | y |
|---|---|---|---|---|---|---|---|---|
| 9 | 0.85 | 0 | 0 | 0.05 | Gd | 0.06 | Mg | 0.05 |
| 10 | 1.00 | 0 | 0.01 | 0.03 | Gd | 0.10 | Mg | 0.05 |
| 11 | 1.01 | 0.01 | 0.01 | 0 | Gd | 0.15 | Mg | 0.08 |
| 12 | 1.02 | 0 | 0.02 | 0.01 | Gd | 0.20 | Mg | 0.12 |
| 13 | 1.03 | 0.01 | 0 | 0.02 | Gd | 0.30 | Mg | 0.14 |
| 14 | 1.04 | 0.02 | 0.03 | 0 | Gd | 0.10 | Mg | 0.08 |
| 15 | 1.03 | 0.25 | 0 | 0 | Gd | 0.08 | Mg | 0.03 |
| 16 | 1.03 | 0 | 0.50 | 0 | Gd | 0.10 | Mg | 0.05 |
| 17 | 1.03 | 0 | 0 | 0.40 | Gd | 0.06 | Mg | 0.04 |
| 18 | 1.03 | 0 | 0 | 0.02 | Gd | 0.05 | Mg | 0.03 |
| 19 | 1.03 | 0.01 | 0.02 | 0 | Gd | 0.50 | Mg | 0.30 |
| 20* | 1.03 | 0.01 | 0.01 | 0.10 | Gd | 0.04 | Mg | 0.02 |
| 21* | 1.03 | 0.01 | 0.01 | 0.10 | Gd | 0.06 | Mg | 0.01 |
| 22 | 1.05 | 0.01 | 0.01 | 0.30 | La | 0.30 | Mg | 0.20 |
| 23 | 1.03 | 0.1 | 0.3 | 0.20 | Ce | 0.30 | Mg | 0.20 |
| 24 | 1.01 | 0.05 | 0.02 | 0.20 | Pr | 0.20 | Mg | 0.15 |

TABLE 2-continued

| | | | | | | | | |
|---|---|---|---|---|---|---|---|---|
| 25 | 0.90 | 0.01 | 0.01 | 0.10 | Nd | 0.20 | Mg | 0.10 |
| 26 | 1.03 | 0.1 | 0 | 0.40 | Sm | 0.20 | Mg | 0.15 |
| 27 | 1.03 | 0.05 | 0.03 | 0.20 | Eu | 0.15 | Mg | 0.10 |
| 28 | 1.03 | 0.05 | 0.10 | 0 | Tb | 0.15 | Mg | 0.08 |
| 29 | 1.03 | 0.06 | 0 | 0.01 | Dy | 0.10 | Mg | 0.04 |
| 30 | 1.03 | 0.10 | 0.10 | 0 | Ho | 0.10 | Mg | 0.03 |
| 31 | 1.03 | 0.15 | 0 | 0.01 | Y | 0.10 | Mg | 0.03 |
| 32 | 1.04 | 0.20 | 0.50 | 0 | Er | 0.07 | Mg | 0.03 |
| 33 | 1.03 | 0.20 | 0.30 | 0 | Tm | 0.07 | Mg | 0.03 |
| 34 | 1.03 | 0.25 | 0.01 | 0 | Yb | 0.05 | Mg | 0.02 |
| 35 | 1.03 | 0.25 | 0.01 | 0 | Lu | 0.05 | Mg | 0.02 |
| 36 | 1.03 | 0.01 | 0.01 | 0 | Sm | 0.08 | Al | 0.06 |
| 37 | 1.03 | 0 | 0.02 | 0.01 | Sm | 0.08 | Cr | 0.06 |
| 38 | 1.03 | 0 | 0 | 0.01 | Gd | 0.15 | Ni | 0.08 |
| 39 | 1.03 | 0.02 | 0 | 0 | Gd | 0.10 | Mn | 0.04 |
| 40 | 1.03 | 0.01 | 0.01 | 0 | Gd | 0.12 | Mg:Mn | 0.04:0.04 |
| 41 | 1.03 | 0 | 0 | 0.02 | Dy | 0.10 | Zn | 0.08 |
| 42 | 1.03 | 0 | 0 | 0.02 | Dy | 0.06 | Mn | 0.02 |
| 43 | 1.03 | 0.25 | 0.01 | 0 | Dy | 0.08 | Al:Mn | 0.02:0.03 |
| 44 | 1.03 | 0.01 | 0.01 | 0.01 | Sm:Dy | 0.10:0.10 | Mg:Zn | 0.10:0.03 |
| 45 | 1.03 | 0 | 0.01 | 0.02 | Gd:Y | 0.08:0.08 | Ni:Mn | 0.08 |
| 46 | 1.03 | 0.01 | 0.04 | 0 | Dy:Y | 0.10:0.05 | Ni:Al | 0.05:0.03 |
| 47 | 1.03 | 0.03 | 0 | 0.01 | Gd:Dy:Yb | 0.10:0.05:0.05 | Mn | 0.10 |

| Sample Number | Subsequent Addition (mol part) | | Calcination Temperature (° C.) | Peak Ratio $BaCO_3/BaTiO_3$ | Grain Diameter (μm) | Failure Rate |
|---|---|---|---|---|---|---|
| | MnO | $SiO_2$ | | | | |
| 9 | 1.00 | 2.00 | 950 | 175/1000 | 0.51 | 0/100 |
| 10 | 1.00 | 2.00 | 950 | 181/1000 | 0.47 | 0/100 |
| 11 | 1.00 | 2.00 | 1000 | 182/1000 | 0.45 | 0/100 |
| 12 | 1.00 | 2.00 | 1000 | 184/1000 | 0.44 | 0/100 |
| 13 | 1.00 | 2.00 | 1000 | 189/1000 | 0.48 | 0/100 |
| 14 | 1.00 | 2.00 | 1000 | 146/1000 | 0.37 | 0/100 |
| 15 | 1.00 | 2.00 | 950 | 192/1000 | 0.50 | 0/100 |
| 16 | 1.00 | 2.00 | 1000 | 140/1000 | 0.38 | 0/100 |
| 17 | 1.00 | 2.00 | 1000 | 162/1000 | 0.45 | 1/100 |
| 18 | 1.00 | 2.00 | 950 | 185/1000 | 0.50 | 1/100 |
| 19 | 1.00 | 2.00 | 1050 | 121/1000 | 0.45 | 1/100 |
| 20* | 1.00 | 2.00 | 950 | 186/1000 | 1.1 | 100/100 |
| 21* | 1.00 | 2.00 | 950 | 184/1000 | 1.3 | 100/100 |
| 22 | 1.00 | 2.00 | 1050 | 129/1000 | 0.40 | 5/100 |
| 23 | 1.00 | 2.00 | 1050 | 120/1000 | 0.44 | 3/100 |
| 24 | 1.00 | 2.00 | 1050 | 125/1000 | 0.46 | 4/100 |
| 25 | 1.00 | 2.00 | 1050 | 124/1000 | 0.48 | 4/100 |
| 26 | 1.00 | 2.00 | 1000 | 181/1000 | 0.50 | 1/100 |
| 27 | 1.00 | 2.00 | 1000 | 180/1000 | 0.50 | 0/100 |
| 28 | 1.00 | 2.00 | 1000 | 147/1000 | 0.44 | 0/100 |
| 29 | 1.00 | 2.00 | 1000 | 144/1000 | 0.36 | 0/100 |
| 30 | 1.00 | 2.00 | 1000 | 152/1000 | 0.33 | 0/100 |
| 31 | 1.00 | 2.00 | 1000 | 160/1000 | 0.35 | 3/100 |
| 32 | 1.00 | 2.00 | 1000 | 148/1000 | 0.42 | 3/100 |
| 33 | 1.00 | 2.00 | 1000 | 158/1000 | 0.43 | 5/100 |
| 34 | 1.00 | 2.00 | 1000 | 141/1000 | 0.38 | 3/100 |
| 35 | 1.00 | 2.00 | 1000 | 136/1000 | 0.38 | 4/100 |
| 36 | 1.00 | 2.00 | 1000 | 120/1000 | 0.45 | 1/100 |
| 37 | 1.00 | 2.00 | 1000 | 122/1000 | 0.47 | 1/100 |
| 38 | 1.00 | 2.00 | 1000 | 170/1000 | 0.33 | 0/100 |
| 39 | 0.00 | 2.00 | 1000 | 180/1000 | 0.36 | 0/100 |
| 40 | 0.00 | 2.00 | 1000 | 168/1000 | 0.35 | 0/100 |
| 41 | 1.00 | 2.00 | 1000 | 180/100 | 0.47 | 5/100 |
| 42 | 0.00 | 2.00 | 950 | 188/1000 | 0.55 | 5/100 |
| 43 | 0.00 | 2.00 | 1000 | 132/1000 | 0.42 | 2/100 |
| 44 | 1.00 | 2.00 | 1000 | 172/1000 | 0.38 | 3/100 |
| 45 | 0.00 | 2.00 | 1000 | 157/1000 | 0.40 | 0/100 |
| 46 | 1.00 | 2.00 | 1000 | 152/1000 | 0.39 | 0/100 |
| 47 | 0.00 | 2.00 | 1000 | 159/1000 | 0.44 | 0/100 |

Table 2 shows that as long as the contents of the respective elements constituting $(Ba_{1-h-m-x}Ca_hSr_mRe_x)_k(Ti_{1-n-y}Zr_nM_y)O_3$ satisfy the respective relationships of $0.05 \leq x \leq 0.50$, $0.02 \leq y \leq 0.3$, $0.85 \leq k \leq 1.05$, $0 \leq h \leq 0.25$, $0 \leq m \leq 0.50$, and $0 \leq n \leq 0.40$, a dielectric ceramic which meets the requirement of an average grain diameter of 0.6 μm or less can be obtained when the peak ratio is 15/1000 or more and 200/1000 or less, regardless of the types or combination of the Re element and M element. Furthermore, an excellent insulation degradation lifetime characteristic can be achieved with an extremely low failure rate, even when the dielectric ceramic layers are thin and have a thickness of 1.5 μl, with the average grain diameter of 0.6 μm or less.

On the other hand, in samples 20 and 21 with either the Re content x or the M content y outside the range $0.05 \leq x \leq 0.50$ or $0.02 \leq y \leq 0.3$, it was difficult to keep the grain diameters of 0.6 μm or less. Therefore, samples 20 and 21 exhibited a failure rate of 100/100, and an inferior insulation degradation lifetime.

In the case of compositions such as samples 20 and 21 described above, it has been confirmed that if the calcination temperature is lowered, the unreacted reactant will also diffuse and participate in a solid solution formation during main calcination, resulting in an inability to suppress grain growth.

When the Re element was weighed as in the general formula, on the assumption of barium titanate brought into A sites of a solid solution in the experimental examples described above, no problem will be caused against advantageous effects of the present invention even when Re is brought into B sites of a solid solution in an actually synthesized powder.

What is claimed is:

1. A sintered dielectric ceramic having crystal grains and comprising:
    a main component comprising a barium titanate based composite oxide represented by the general formula: $(Ba_{1-h-m-x}Ca_hSr_mRe_x)_k(Ti_{1-n-y}Zr_nM_y)O_3$, where Re is at least one member of the group consisting of La, Ce, Pr, Nd, Sm, Eu, Gd, Tb, Dy, Ho, Er, Tm, Yb, Lu, and Y, M is at least one member of the group consisting of Mg, Ni, Mn, Al, Cr, and Zn, $0.05 \leq x \leq 0.50$, $0.02 \leq y \leq 0.3$, $0.85 \leq k \leq 1.05$, $0 \leq h \leq 0.25$, $0 \leq m \leq 0.50$, and $0 \leq n \leq 0.40$; and
    a sintering aid accessory component,
    wherein the average grain diameter of the crystal grains in the sintered body is 0.6 μm or less.

2. The sintered dielectric ceramic according to claim 1, wherein $0.06 \leq x \leq 0.3$, $0.03 \leq y \leq 0.2$, $1.00 \leq k \leq 1.04$, $0 \leq h \leq 0.20$, $0 \leq m \leq 0.3$, $0 \leq n \leq 0.3$, and wherein the average grain diameter of crystal grains in the sintered body is 0.58 μm or less.

3. A laminated ceramic capacitor comprising:
    a capacitor main body comprising a plurality of laminated dielectric ceramic layers and a plurality of internal electrodes each disposed at different interfaces between adjacent dielectric ceramic layers; and
    at least two external electrodes disposed at different positions on an external surface of the capacitor main body and electrically connected to different ones of the internal electrodes,
    wherein the dielectric ceramic layers comprise the dielectric ceramic according to claim 2.

4. The sintered dielectric ceramic according to claim 1, wherein the average grain diameter of crystal grains in the sintered body is 0.50 μm or less.

5. The sintered dielectric ceramic according to claim 4, wherein Re comprises Gd.

6. The sintered dielectric ceramic according to claim 1, wherein M comprises Mg.

7. A laminated ceramic capacitor comprising:
    a capacitor main body comprising a plurality of laminated dielectric ceramic layers and a plurality of internal electrodes each disposed at different interfaces between adjacent dielectric ceramic layers; and
    at least two external electrodes disposed at different positions on an external surface of the capacitor main body and electrically connected to different ones of the internal electrodes,
    wherein the dielectric ceramic layers comprise the dielectric ceramic according to claim 6.

8. The sintered dielectric ceramic according to claim 1, wherein Re comprises Gd.

9. A laminated ceramic capacitor comprising:
    a capacitor main body comprising a plurality of laminated dielectric ceramic layers and a plurality of internal electrodes each disposed at different interfaces between adjacent dielectric ceramic layers; and
    at least two external electrodes disposed at different positions on an external surface of the capacitor main body and electrically connected to different ones of the internal electrodes,
    wherein the dielectric ceramic layers comprise the dielectric ceramic according to claim 8.

10. A laminated ceramic capacitor comprising:
    a capacitor main body comprising a plurality of laminated dielectric ceramic layers and a plurality of internal electrodes each disposed at different interfaces between adjacent dielectric ceramic layers; and
    at least two external electrodes disposed at different positions on an external surface of the capacitor main body and electrically connected to different ones of the internal electrodes,
    wherein the dielectric ceramic layers comprise the dielectric ceramic according to claim 1.

11. A barium titanate based composite oxide represented by the general formula: $(Ba_{1-h-m-x}Ca_hSr_mRe_x)_k(Ti_{1-n-y}Zr_nM_y)O_3$, where Re is at least one member of the group consisting of La, Ce, Pr, Nd, Sm, Eu, Gd, Tb, Dy, Ho, Er, Tm, Yb, Lu, and Y, M is at least one member of the group consisting of Mg, Ni, Mn, Al, Cr, and Zn, $0.05 \leq x \leq 0.50$, $0.02 \leq y \leq 0.3$, $0.85 \leq k \leq 1.05$, $0 \leq h \leq 0.25$, $0 \leq m \leq 0.50$, and $0 \leq n \leq 0.40$;
    wherein the intensity ratio between the (111) diffraction peak of $BaCO_3$ and the (110) diffraction peak of $BaTiO_3$ by X-ray diffraction analysis of the calcined powder is 15/1000 to 200/1000.

12. The barium titanate based composite oxide according to claim 11, wherein $0.06 \leq x \leq 0.3$, $0.03 \leq y \leq 0.2$, $1.00 \leq k \leq 1.04$, $0 \leq h \leq 0.20$, $0 \leq m \leq 0.3$, $0 \leq n \leq 0.3$, and the intensity ratio between the (111) diffraction peak of $BaCO_3$ and the (110) diffraction peak of $BaTiO_3$ by X-ray diffraction analysis of the calcined powder is 120/1000 to 189/1000.

13. The barium titanate based composite oxide according to claim 11, wherein M comprises Mg.

14. The barium titanate based composite oxide according to claim 13, wherein Re comprises Gd.

15. The barium titanate based composite oxide according to claim 11, wherein Re comprises Gd.

16. A method for manufacturing a dielectric ceramic comprising:
    providing a mixture of a barium titanate based composite oxide represented by the general formula: $(Ba_{1-h-m-x}Ca_hSr_mRe_x)_k(Ti_{1-n-y}Zr_nM_y)O_3$, where Re is at least one member of the group consisting of La, Ce, Pr, Nd, Sm, Eu, Gd, Tb, Dy, Ho, Er, Tm, Yb, Lu, and Y, M is at least one member of the group consisting of Mg, Ni, Mn, Al, Cr, and Zn, $0.05 \leq x \leq 0.50$, $0.02 \leq y \leq 0.3$, $0.85 \leq k \leq 1.05$, $0 \leq h \leq 0.25$, $0 \leq m \leq 0.50$, and $0 \leq n \leq 0.40$, and the intensity ratio between a (111) diffraction peak of $BaCO_3$ and a (110) diffraction peak of $BaTiO_3$ by X-ray diffraction analysis of the calcined powder is 15/1000 to 200/1000; and an accessory component sintering aid; and calcining the mixture in a reducing atmosphere.

17. The method according to claim 16, wherein $0.06 \leq x \leq 0.3$, $0.03 \leq y \leq 0.2$, $1.00 \leq k \leq 1.04$, $0 \leq h \leq 0.20$, $0 \leq m \leq 0.3$, and $0 \leq n \leq 0.3$.

18. The method according to claim 16, wherein M comprises Mg.

19. The method according to claim 18, wherein Re comprises Gd.

20. The method according to claim 16, wherein Re comprises Gd.

* * * * *